(12) United States Patent
Ho

(10) Patent No.: US 7,017,055 B1
(45) Date of Patent: Mar. 21, 2006

(54) HUB THAT CAN SUPPLY POWER ACTIVELY

(75) Inventor: Lien-Hsun Ho, Taipei (TW)

(73) Assignee: Cyber Power System Inc., Taipei (TW)

( * ) Notice: Subject to any disclaimer, the term of this patent is extended or adjusted under 35 U.S.C. 154(b) by 0 days.

(21) Appl. No.: 11/006,596

(22) Filed: Dec. 8, 2004

(51) Int. Cl.
G06F 1/26 (2006.01)
H02J 7/00 (2006.01)
H02J 3/32 (2006.01)

(52) U.S. Cl. .................. 713/300; 320/137; 307/46
(58) Field of Classification Search ............. 713/300, 713/310, 340; 320/137; 307/46, 66
See application file for complete search history.

(56) References Cited

U.S. PATENT DOCUMENTS 5,990,577 A * 11/1999 Kamioka et al. ............ 307/26
6,204,574 B1 * 3/2001 Chi .............................. 307/66
6,665,801 B1 * 12/2003 Weiss ........................ 713/300

FOREIGN PATENT DOCUMENTS

JP 2002094545 A * 3/2002
JP 2003241858 A * 8/2003

* cited by examiner

Primary Examiner—Thomas Lee
Assistant Examiner—Suresh K Suryawanshi
(74) Attorney, Agent, or Firm—Rosenberg, Klein & Lee

(57) ABSTRACT

A hub supplying power actively includes an active power supply device having a battery charger, a storage battery, a DC/DC converter, and a control circuit. The hub is connected to a USB of a computer to receive direct current (DC) of the USB. When power demand of the hub is lower than the DC power supply of the USB, the power is supplied by the USB and the storage battery is charged via the battery charger simultaneously. When power demand of the hub is higher than the DC power supply of the USB, the storage battery discharges electricity and supplies power after conversion by the DC/DC converter. When the hub is disconnected to the computer, a power adapter is connected externally to rectify mains electricity and to charge battery. The charged battery outputs the power to supply for the connected peripheral equipment after converting the electricity into direct current.

5 Claims, 9 Drawing Sheets

HUB THAT CAN SUPPLY POWER ACTIVELY

BACKGROUND OF THE INVENTION

1. Field of the Invention

The invention relates in general to a self-powered hub that can supply power actively, and more particularly to a hub that can supply power to connected equipment actively without depending on the universal serial bus (USB) of a computer to supply power.

2. Description of the Related Art

The universal serial bus (USB) for computers was developed by large manufacturers such as INTEL™. The USB can simultaneously connect a computer to peripheral equipment of up to 127 devices. A basic interface specification of the USB includes a positive/negative data line D+, D− and a positive/negative power cord V+ and V−, which is the most common and popular USB interface. Despite the USB being able to connect up to 127 peripheral devices simultaneously, USB ports in a computer are actually limited. If desiring to extend usages of the peripheral equipment of the USB interface, a hub is the best choice. The hub is used to extend the quantity of the USB connection ports, so as to extend the peripheral equipment of the USB interface of the computer. As described above, since the USB is provided with the power cord, the computer can supply power to the peripheral equipment via the USB. However, there is a premise for this function.

Firstly, since the computer supplies power via the USB, no matter whether the peripheral equipment is connected to the computer directly or via the hub, the power only can be supplied in an online state. Hence the power cannot be supplied in an off-line state.

Secondly, since the USB can connect to 127 peripheral devices at the same time, even though it is not possible to connect to so many peripheral devices in practice, it is likely to connect to several USB interface peripheral devices and all of the devices consume power simultaneously. In such a circumstance, the direct current supplied by the USB is insufficient.

To sum up, although the computer can use the hub to extend the quantity of the connected USB interface peripheral devices, once the hub is offline or connects to several peripheral devices consuming power simultaneously, the power supply of the USB is definitely insufficient. Thus, there is a need for the hub to overcome the aforementioned drawbacks.

SUMMARY OF THE INVENTION

In view of the above-mentioned drawbacks, it is therefore an objective of the present invention to provide a universal serial bus (USB) hub that can actively supply power for connected peripheral equipment in an off-line state.

It is a further objective to provide a USB hub that can actively supply power for connected peripheral equipment in a low-power online state of a computer.

In order to achieve the above-mentioned objectives, a main technique is applied by having an active power supply device configured inside the hub. The active power supply device is connected to a power cord provided in the USB. The active power supply device includes a battery charger, a storage battery, a DC/DC converter, and a control circuit. An input terminal of the battery charger is connected to the power cord of the USB. The storage battery is connected to an output terminal of the battery charger to be charged by the power supply of the USB. An input terminal of the DC/DC converter is connected to the storage battery, and an output terminal of the DC/DC converter is connected to the power cord of the USB. The control circuit includes an input terminal connected to the storage battery and two output terminals respectively connected to the DC/DC converter and the battery charger.

Using the above-mentioned device, the control circuit can generate a transformation control signal according to electric power of the USB, and transmit the control signal to the DC/DC converter. When a power demand is higher than the power supply of the USB, the DC/DC converter is enabled and the battery charger is shut down to stop charging of the storage battery. The storage battery then discharges electricity and processes power transformation by the DC/DC converter to supply power to the USB via the power cord, so as to actively supply power to the connected USB peripheral equipment. In this way, not only can the peripheral equipment be charged in an off-line state of both the USB and a computer, but also a power adapter can be connected externally to rectify mains electricity and to charge the battery. The charged battery outputs power to supply for the connected peripheral equipment after converting the electricity into direct current. Thereby, even in an online state, once the electric power of the USB is insufficient, the alternative power can be supplied actively.

DETAILED DESCRIPTION OF THE INVENTION

Figure 1:
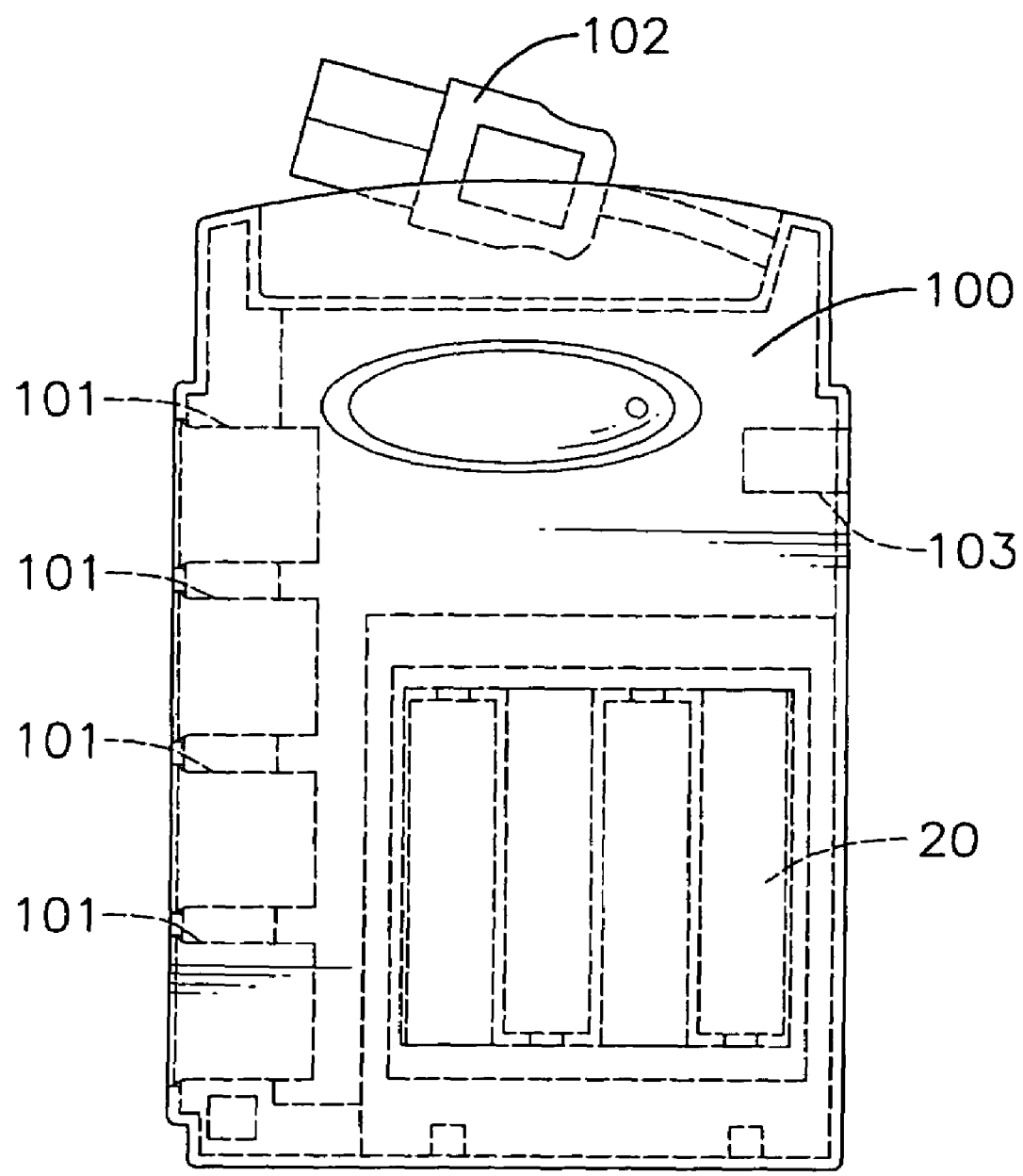
FIG. 1 shows an outward appearance view of a practical embodiment of the present invention.

Referring to FIG. 1, an outward appearance view of a practical embodiment of the present invention is shown. A body 100 includes a plurality of USB connection ports 101. The hub body 100 is configured with a USB interface conducting wire 102 and a socket 103 for a power adapter that is not shown in the diagram. Each of the USB connection ports 101 is connected to the USB by the USB interface conducting wire 102.

Figure 2:
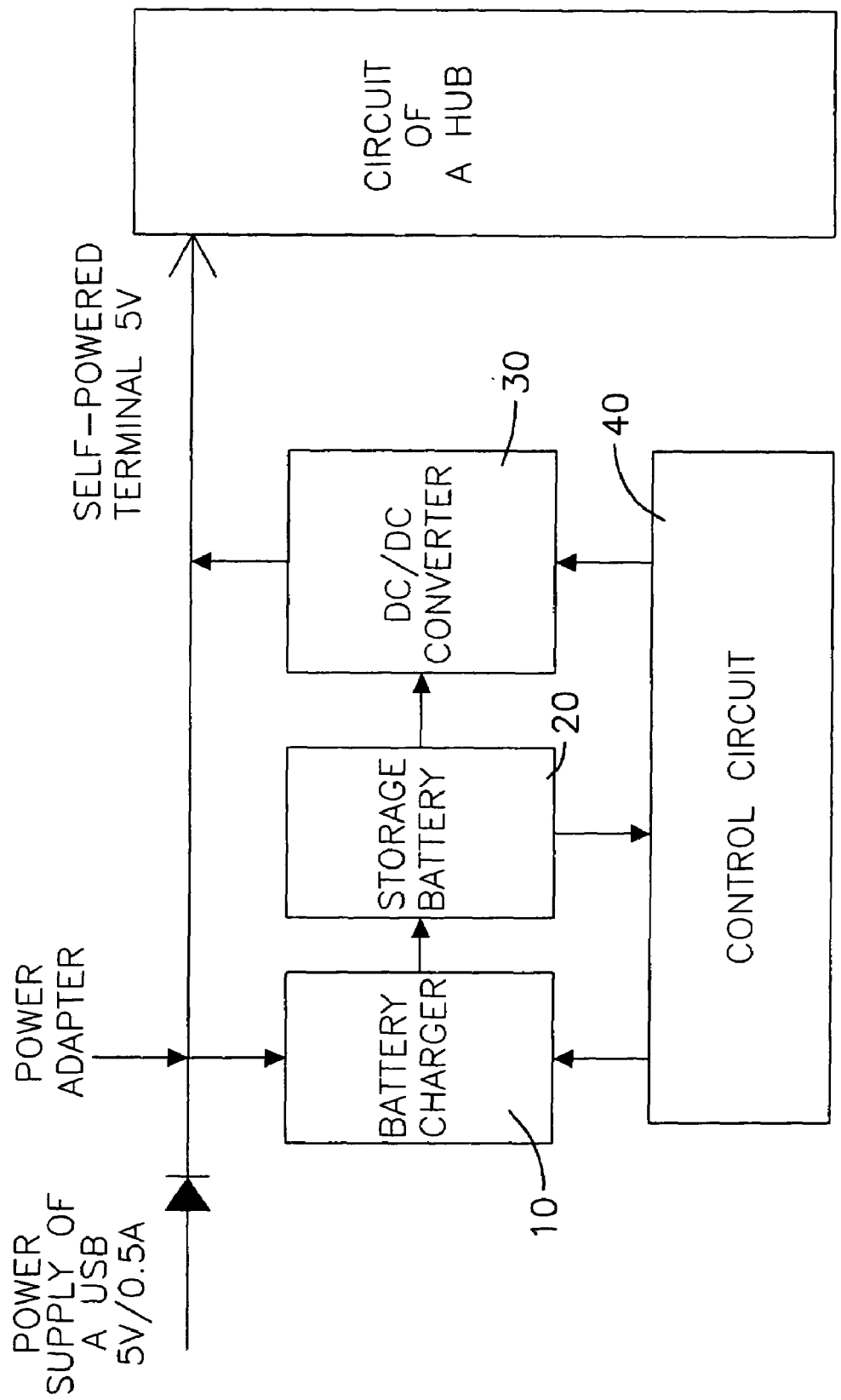
FIG. 2 shows a circuit block diagram of the present invention.

The above-mentioned body 100 is similar to a conventional hub with regard to a fundamental form and a function of the hub. A difference lies in that the hub of the present invention further provides an active power supply function. The active power supply function is implemented by having the above-mentioned body 100 configured with an active power supply device made up of a circuit. Referring to FIG. 2, a circuit block diagram of an embodiment of the present invention is shown. A battery charger 10 includes an input terminal connected to a power cord of a universal serial bus (USB). The input terminal passes power through a diode or a power adapter to directly input voltage of 5V and to supply the power to a storage battery 20, and also the battery charger 10 receives a disable signal of a control circuit 40 to determine whether to charge the storage battery or not.

An input terminal of the storage battery 20 is connected to an output terminal of the above-mentioned battery charger 10. When the power supply of the USB is regular, the battery charger 10 can utilize the power supply of the USB to charge and directly provide input power to a DC/DC converter 30 and the control circuit 40.

An input terminal of the DC/DC converter 30 is connected to an output terminal of the storage battery 20.

The control circuit 40 includes an input terminal connected to the storage battery 20 and two output terminals respectively connected to the DC/DC converter 30 and the battery charger 10. The control circuit 40 will generate an enable/disable signal to control whether the DC/DC converter 30 has to output direct current.

The control circuit 40 generates a control signal according to electric power of the storage battery 20 and transmits the control signal to the DC/DC converter 30. When the power supply of the USB is regular, the DC/DC converter 30 is in an OFF state due to the control signal and the battery charger 10 operates via an enable signal. Thereby the storage battery 20 can be charged by the power supply of the USB passing through the battery charger 10.

When an electric power demand of the hub is higher than the power supply of the USB, the enable signal will start the DC/DC converter 30 and also shut down the battery charger 10 to stop charging of the storage battery 20 at the same time. The storage battery 20 immediately discharges electricity to pass through the DC/DC converter 30 to convert power, and then the power is supplied to the USB via the power cord. Thereby the power is actively supplied to USB connected peripheral equipment.

Referring to FIGS. 3A–3G, a further detailed circuit structure diagram is shown. A function principle is described as follows.

Figure 3A:
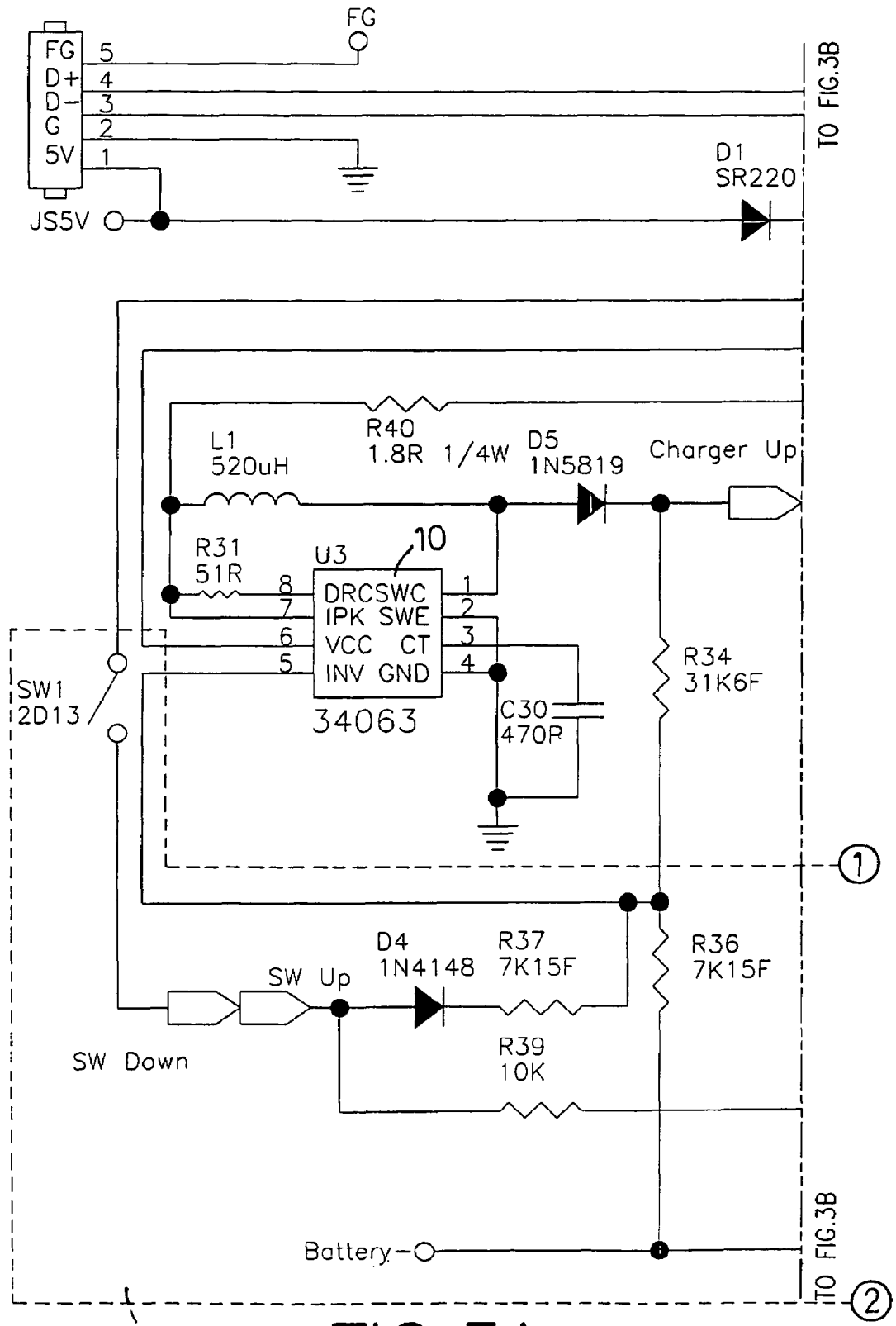
FIGS. 3A–3G show an overall circuit diagram of a one to four output terminals of a preferred embodiment diagram of the present invention.
Figure 3B:
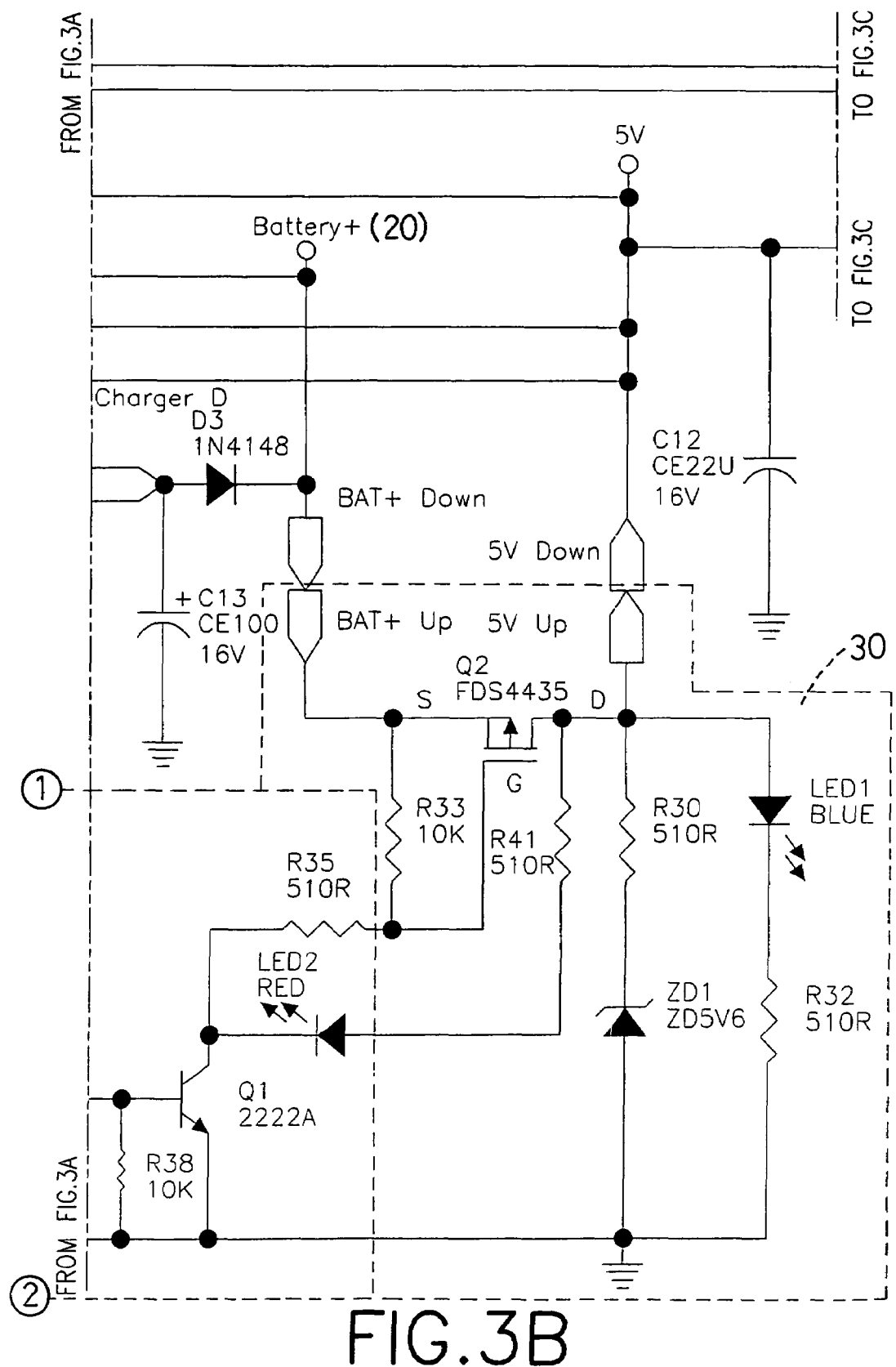
Figure 3C:
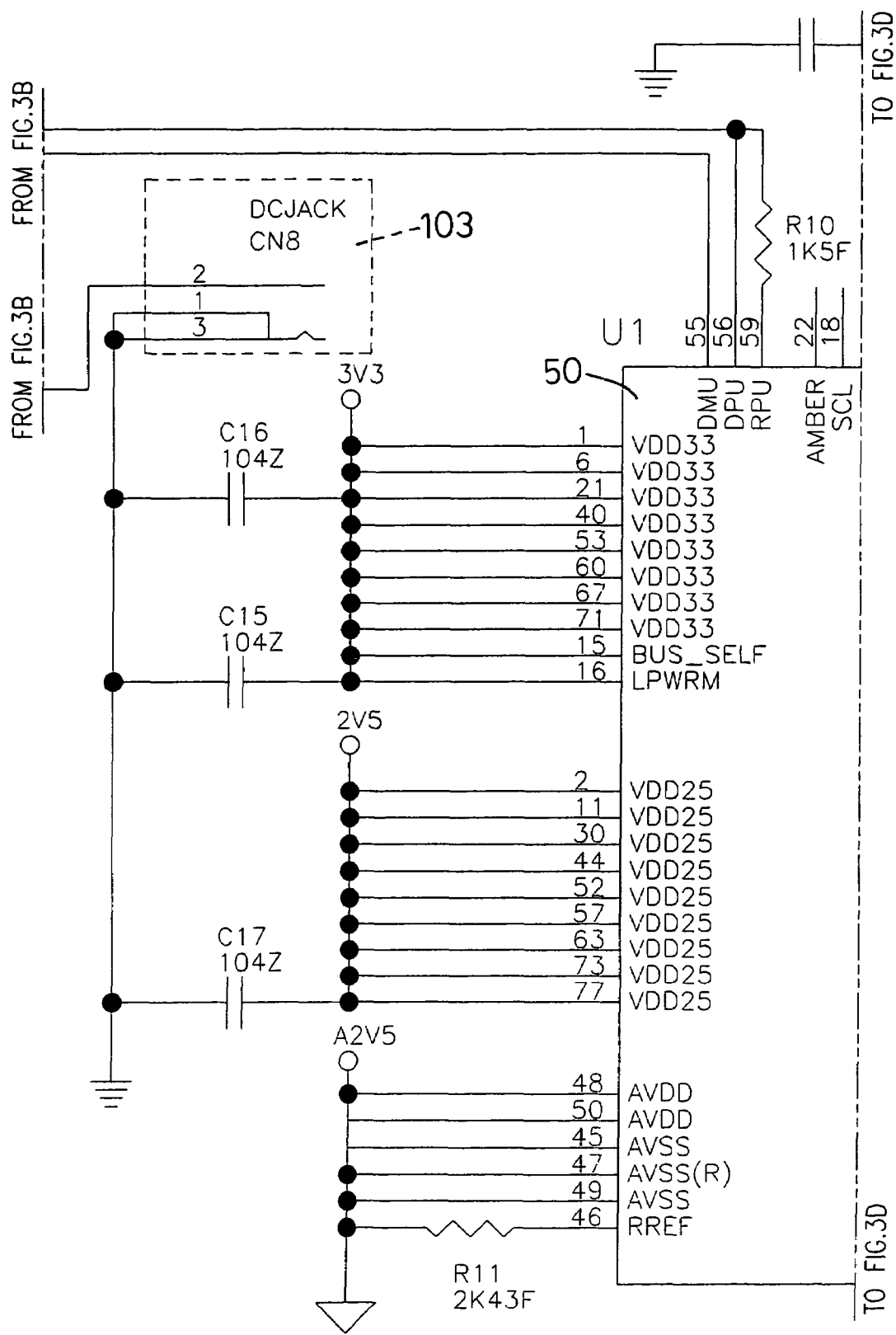
Figure 3D:
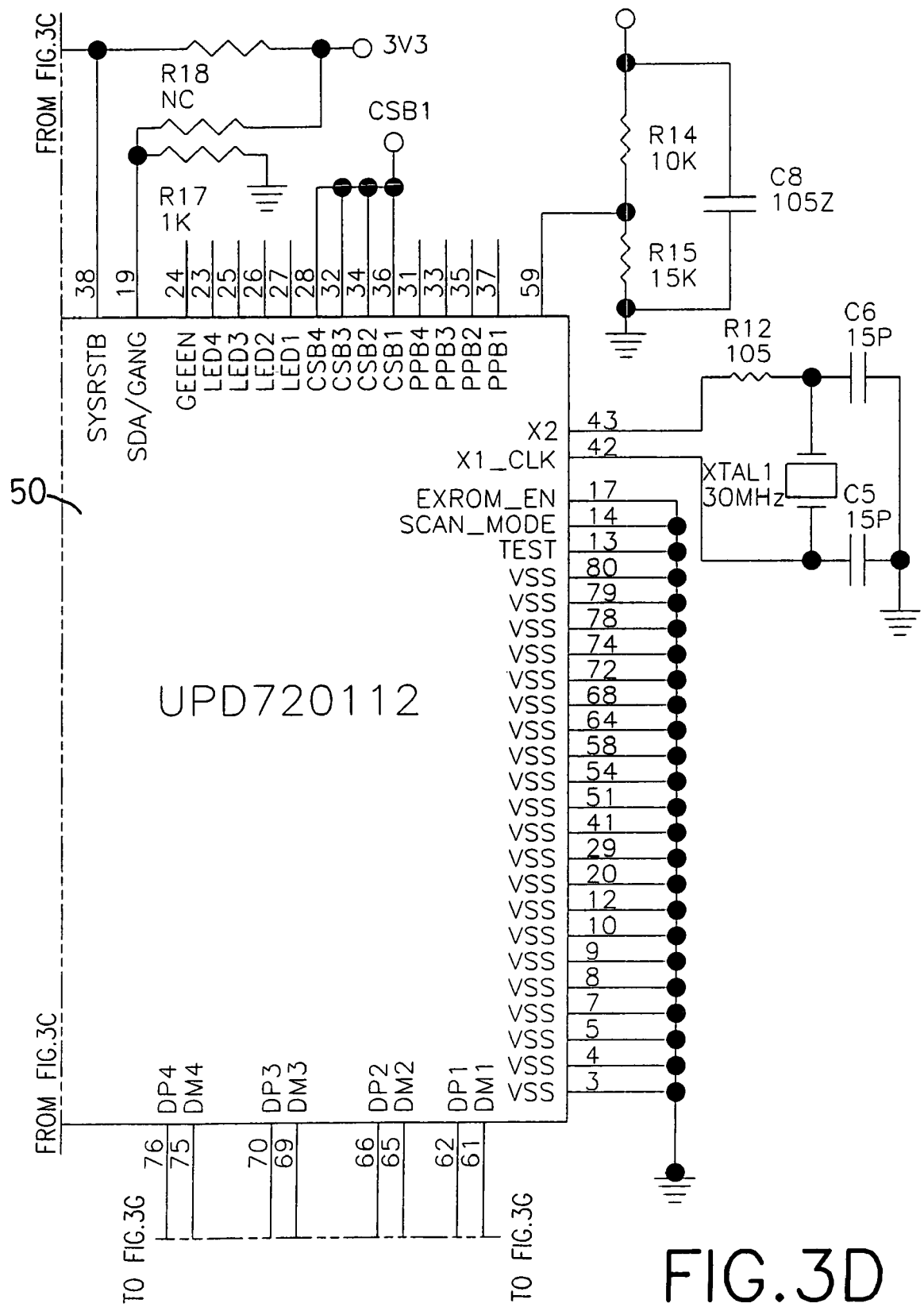
Figure 3E:
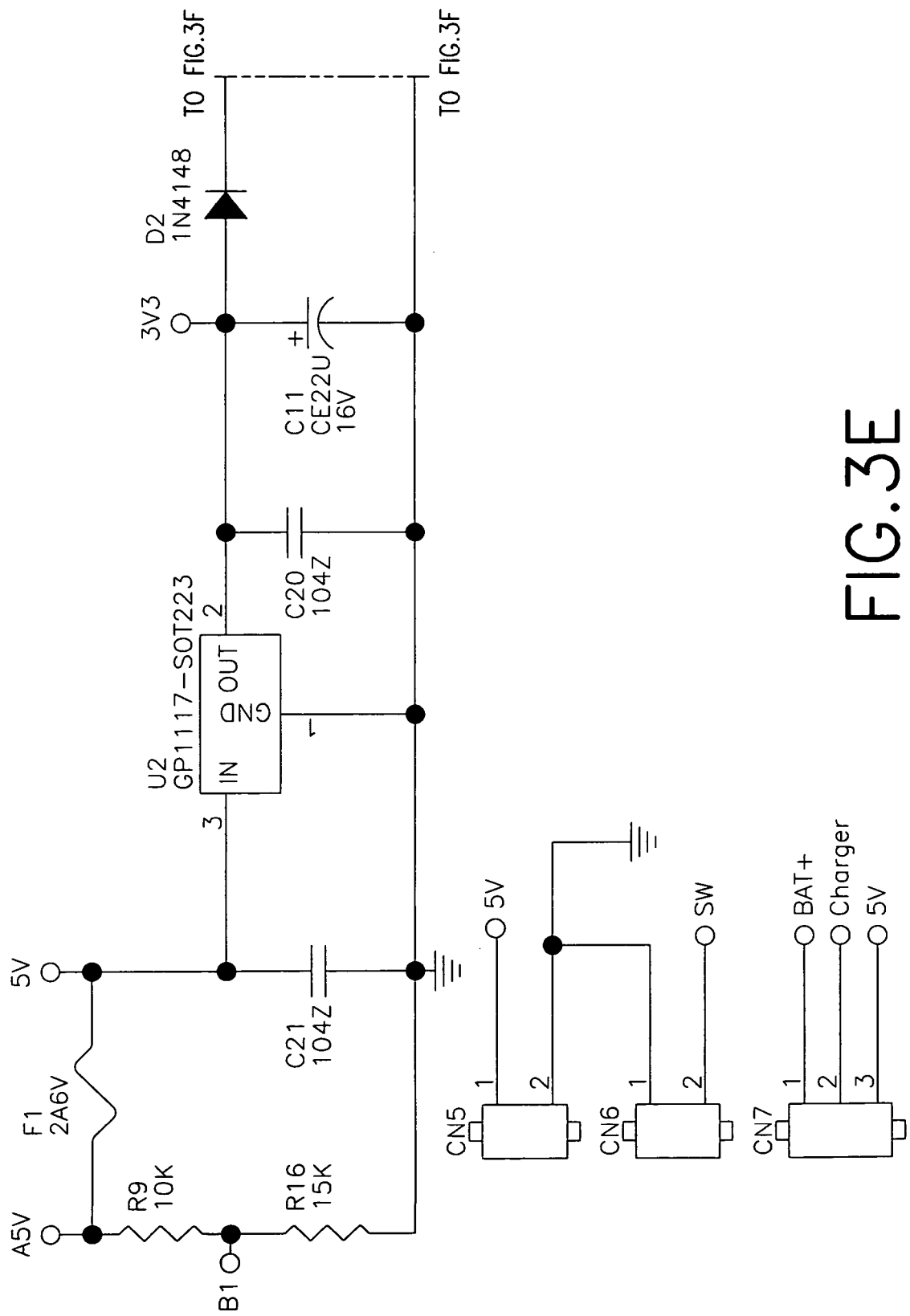
Figure 3F:
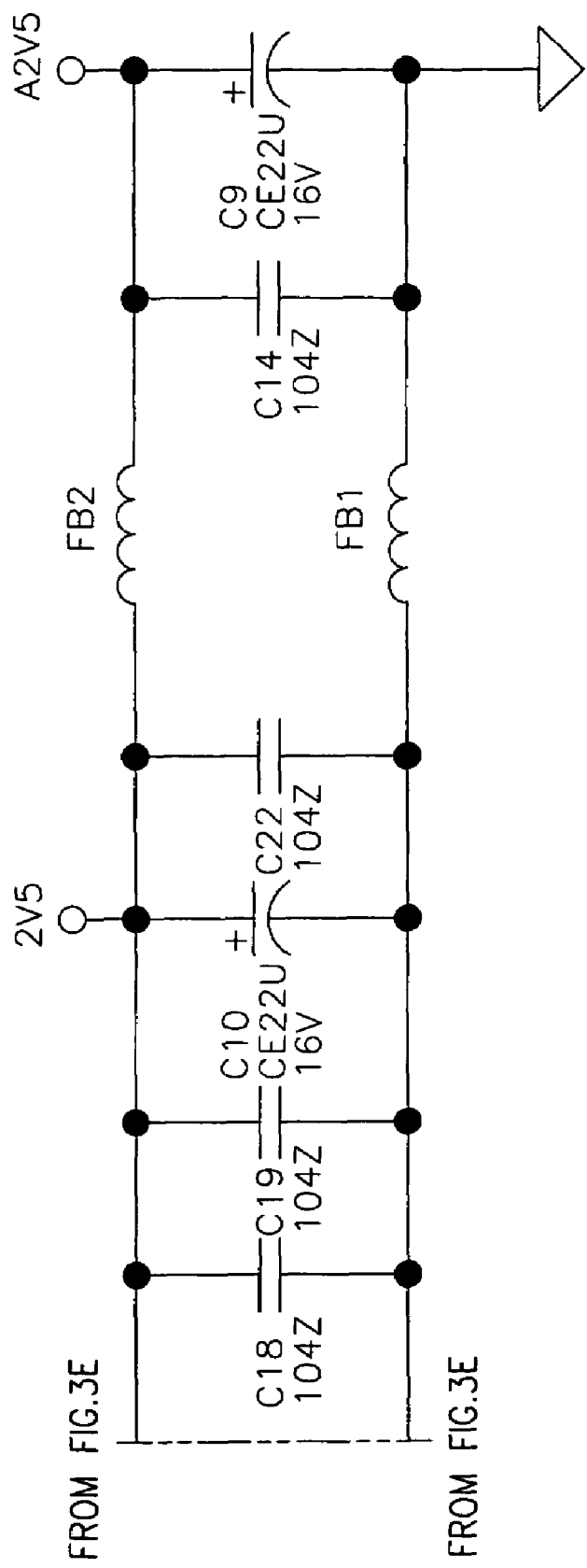
Figure 3G:
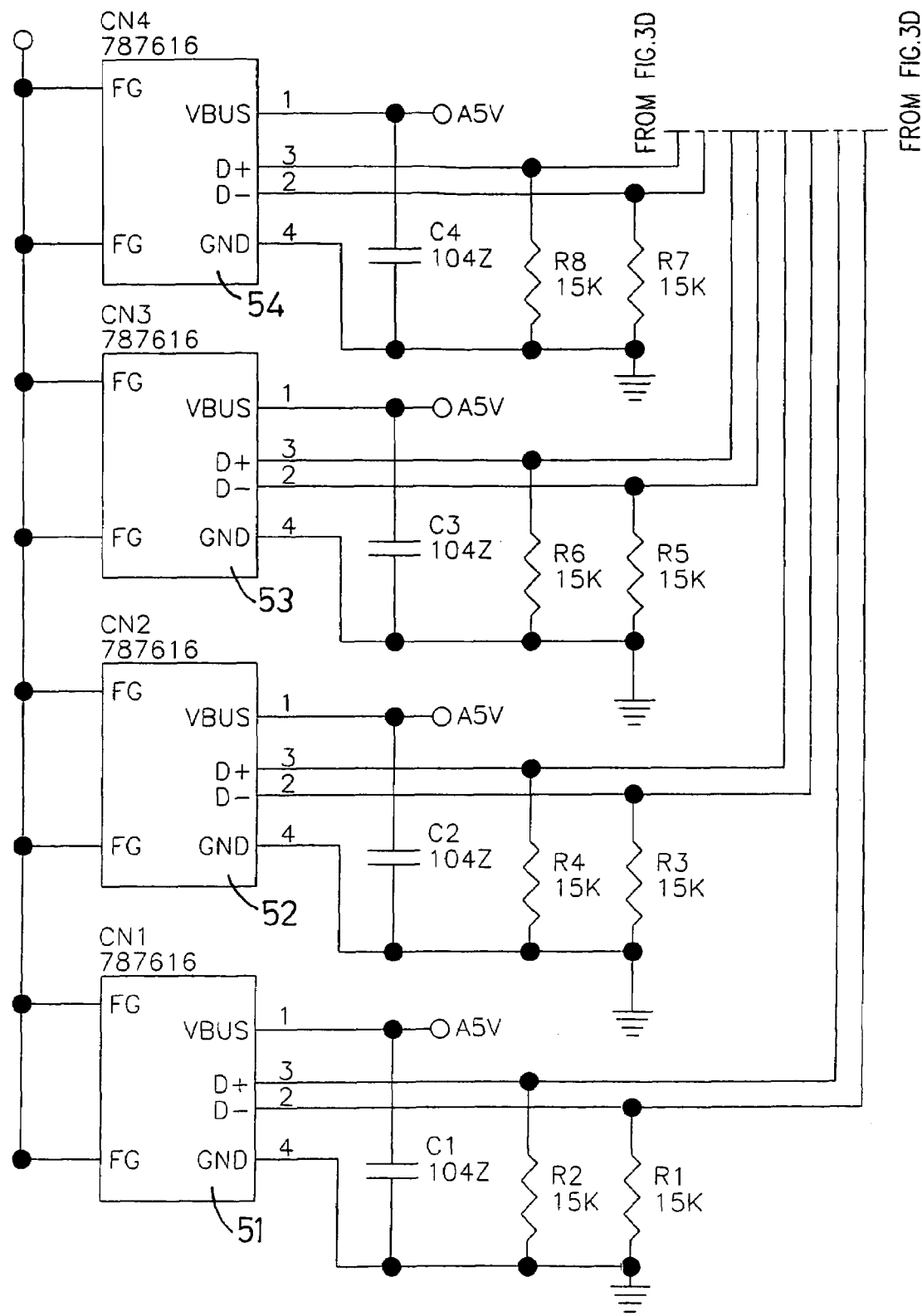

Firstly, with reference to FIGS. 3D and 3G, a preferred embodiment of the present invention provides a one to four hub, including a hub circuit 50 and four USB connection ports 51 to 54. Referring to FIGS. 3E to 3G, the USB BusPower provides 5V/0.5 A power for an input terminal. The power is supplied to the four USB connection ports 51 to 54 by a self-powered terminal 5V and a safety fuse F1. Hence a maximum usage electric power is 5V/2 A.

When the preferred embodiment of the present invention is connected to the USB BusPower, the electric power of the USB is inputted via a diode D1, and then the self-powered terminal 5V charges the storage battery 20 via a battery charger 10. When the hub is disconnected from the USB, an external power adapter, which is not shown in the diagram, also can be used to input the power to the self-powered terminal 5V via a socket 103 into which the power adapter is inserted. In the same way, the battery charger 10 can charge the storage battery 20.

The battery charger 10 is made up of a simple boost circuit of an integrated circuit, serial number IC34063. The simple boost circuit is used to boost input voltage until the voltage for charging the battery is sufficient, and then the battery is charged.

The storage battery 20 can be four rechargeable batteries. Each of the rechargeable batteries is 1.4V. Voltage of the four series-connected rechargeable batteries is 5.6V. The battery charger 10 provides a power source. A contact Battery+ of the storage battery 20 is connected to the DC/DC converter 30 and the battery charger 10.

When the storage battery 20 discharges electricity for the four USB connection ports 51 to 54 of the hub, the control circuit 40 is used. The control circuit 40 includes a manual switch SW1 and an electric switch of a transistor Q1. When the USB input power of the present invention is insufficient, the manual switch SW1 is connected, so that electricity goes to a back terminal of a pin 5 of the battery charger 10 via a diode D4 and a resistance R37 to stop the battery charger 10. The transistor Q1 also triggers the storage battery 20 to be electric simultaneously, and a collector forms low electric potential to trigger a transistor Q2 of the DC/DC converter 30 to be electric. Thereby an enable signal is sent out to start the DC/DC converter 30.

The DC/DC converter 30 is made up of the transistor Q2 of P-MOSFET and a Zener diode regulated circuit. An output voltage reaches an optimal value by voltage decrease while the transistor Q2 becomes electric and adjusts the Zener diode value. Moreover, the source/drain of the transistor Q2 are connected to the storage battery 20 and the self-powered terminal 5V, and the gate is connected to the output terminal of the control circuit 40. When the transistor Q2 is electric, the electricity of the storage battery 20 is supplied to the self-powered terminal 5V via the DC/DC converter 30, so that the self-powered terminal 5V supplies power to the four USB connection ports 51 to 54.

The practical circuit structure of the preferred embodiment of the present invention of the above-description illustrates that the present invention provides not only the fundamental functions of the hub, but also a self-powered function. As is generally known, the USB provides direct current power of 5V/0.5 A, which is insufficient for all of the connected USB peripheral equipment of the hub at the same time. At this time, the voltage of the USB decreases. When the voltage of the USB decreases to a voltage such as 4.5V, the control circuit 40 shuts down the battery charger 10 to stop charging the storage battery, and also starts the DC/DC converter 30 simultaneously to convert power and then provides the direct current to the USB via its power cord. Thereby the peripheral equipment connected to the hub is charged actively. To facilitate the power supply, the hub of the present invention also supports the off-line state of the computer by rectifying alternating current (AC) via the power adapter and delivering the power to the USB to charge the storage battery 20 via the battery charger 10. In addition, the storage battery 20 also can adopt a replacement manner, so as to maintain regular power supply in case of low power and situations where recharging is not possible.

In conclusion, the present invention contributes to a power supply problem of the USB interface peripheral equipment. Therefore, the present invention exactly comprises utility and conforms to novelty non-obviousness and inventive step of requirements of a patent.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hub that can supply power actively comprising:
   a battery charger with an input terminal connected with a power lead of a universal serial bus (USB) cable;
   a storage battery connected to an output terminal of the battery charger to be charged by power supplied from the USB cable;
   a DC/DC converter with an input terminal connected to the storage battery and an output terminal coupled to the power lead of the USB cable; and
   a control circuit with an input terminal connected to the storage battery and two output terminals respectively connected to the DC/DC converter and the battery charger, the control circuit including:

a manual switch connected to the battery charger to start and stop the battery charger; and an electric switch connected to the storage battery and the DC/DC converter to start and stop the DC/DC converter.

2. The hub as claimed in claim 1, further comprising a DC jack coupled to the input terminal of the battery charger for coupling the battery charger to a power source of a power adapter to obtain external power supplementary to the power supplied from the USB cable.

3. The hub as claimed in claim 1, wherein the manual switch is further connected to the battery charger via a diode and a resistance.

4. The hub as claimed in claim 3, wherein the DC/DC converter comprises:

a zener diode regulated circuit connected to the power cord of a USB; and a first transistor connected to a collector terminal of a second transistor of the control circuit, wherein the manual switch triggers the second transistor into a conductive state.

5. The hub as claimed in claim 4, wherein the first transistor of the DC/DC converter is a P-MOSFET.

* * * * *